United States Patent [19]
Yonehara et al.

[11] 3,928,239
[45] Dec. 23, 1975

[54] METHOD FOR THE PRODUCTION OF EXHAUST AND WASTE GASES PURIFYING CATALYSTS

[75] Inventors: Kiyoshi Yonehara, Suita; Kunihiro Kubota, Takatsuki; Tetsuji Ono, Amagasaki; Takashi Ohara, Nishinomiya, all of Japan

[73] Assignee: Nippon Shokubai Kagaku Kogyo Co., Ltd., Japan

[22] Filed: Nov. 29, 1973

[21] Appl. No.: 419,943

[30] Foreign Application Priority Data
  Nov. 30, 1972 Japan.............................. 47-11939
  Nov. 30, 1972 Japan.............................. 47-119397

[52] U.S. Cl............. 252/466 PT; 252/463; 423/212
[51] Int. Cl.$^2$........................................ B01J 23/08
[58] Field of Search........ 252/463, 466 PT; 423/212

[56] References Cited
UNITED STATES PATENTS

| | | | |
|---|---|---|---|
| 3,020,242 | 2/1962 | McCartney et al. | 252/463 X |
| 3,340,205 | 9/1967 | Hayes et al. | 252/463 X |
| 3,535,268 | 10/1970 | Hayes | 252/463 X |
| 3,785,998 | 1/1974 | Hoekstra | 252/466 PT |
| 3,794,588 | 2/1974 | Stiles | 252/463 X |
| 3,806,582 | 4/1974 | Acres et al. | 252/466 PT |

*Primary Examiner*—Helen M. S. Sneed
*Attorney, Agent, or Firm*—Armstrong, Nikaido & Wegner

[57] ABSTRACT

A catalyst used for the purification of exhaust gases from internal combustion engine and waste gases from industrial plants is produced by dissolving an alumina sol with an inorganic acid to form an alumina sol solution, adding thereto a powdered alumina which contains at least 50 % by weight of rho alumina and is capable of forming, upon calcination, an activated alumina to form an alumina slurry, immersing in the alumina slurry a monolithic multicellular chemically inert support, while maintaining said alumina slurry at 0° to 30°C, to deposit an alumina layer on to the surface of said support, aging the alumina layer at a temperature of 50°C or below for at least 30 minutes, drying the alumina layer to form a thin alumina film on the surface of the support, impregnating the so treated support in a noble metal containing solution and activating the so impregnated support.

14 Claims, No Drawings

METHOD FOR THE PRODUCTION OF EXHAUST AND WASTE GASES PURIFYING CATALYSTS

This invention relates to a method for the production of a supported noble metal catalyst used for purification of internal combustion engine exhaust gases and industrial plant waste gases and, particularly, to a method for the production of an exhaust and waste gases purifying catalyst having excellent durability and thermal resistance and sustaining a high purifying capacity for a long period of time in spite of its relatively low noble metal content, by depositing a relatively thin film of an activated alumina on to the surface of a honeycomb-structured support, impregnating the so treated support with a noble metal-containing solution and subjecting the so impregnated support to drying and subsequent activation.

Honeycomb-structured supports consist usually of unitary moldings of a refractory having a softening point exceeding 1,000°C and capable of withstanding expansion and shrinkage accompanying an abrupt change in temperature, such as, e.g., cordierite, lithium-containing alumino-silicates, alpha-alumina and silicon carbide, and it is known to obtain an exhaust and waste gases purifying catalyst by supporting a relatively thin film of an activated alumina on to the support and supporting thereon a noble metal. One of the important matters in the production of such a catalyst is that the activated alumina film is firmly supported on the support with a sufficiently high adhesive strength and, therefore, in a prior method a support is soaked in a concentrated aqueous solution of aluminum nitrate and then dried and heated and this procedure is repeated many times until a sufficient thickness of an activated alumina film is formed on the surface of the support. The prior method however has a drawbacks that it is necessary to repeat impregnation and subsequent drying and calcination many times, the procedure is complicated and, in addition, the adhesive strength of the alumina film obtained is unsatisfactory from a practical point of view. Namely, an activated alumina film deposited on a honeycomb-structured support is blown away within a short period of time by the action of a gas stream accompanied by a thermal change and of a mechanical vibration to decrease the amount of a catalyst supported and, thereby, much decrease the activity of the catalyst, and, when the thickness of the activated alumina film is not uniform, the catalyst exhibits a low activity in areas where the thickness of the activated alumina film is very thin and exhibits a high resistance to gas flow to substantially decrease its activity in areas where the film is too thick.

Accordingly, an object of the present invention is to provide an improved method for the production of an exhaust and waste gases purifying honeycomb-structured noble metal supported catalyst.

An another object of the present invention is to provide a method for the production of an exhaust and waste gases purifying honeycomb-structured noble metal supported catalyst having a long life and a high activity.

In accordance with the method of the present invention, a catalyst for the purification of internal combustion engine exhaust gases and industrial plant waste gases is produced by dissolving an alumina sol with an inorganic acid to form an alumina sol solution, adding to the solution a powdered alumina which comprises at least 50 % by weight of rho-alumina and becomes on calcination an activated alumina (in this specification the term "activated alumina" means alumina in the so called gamma-type transition state other than alpha-alumina.) to form an alumina slurry, immersing in the slurry a monolithic multicellular chemically inert refractory support, while maintaining the slurry at 0° to 30°C, to deposit an alumina layer over the surface of the support, drying the alumina layer, after aging at a temperature not exceeding 50°C for at least 30 minutes, to form a thin film of alumina on the surface of the support, impregnating the so treated support in a noble metal-containing solution and subjecting the so impregnated support to activation.

The catalyst thus prepared is free from cracking and abrasion caused by thermal or mechanical shock because of a high strength of the alumina film adhering the monolithic multicellular support and retains over a long period of time a stable high activity as a catalyst for purifying exhaust gases. Accordingly, the catalyst is of great value for use as a purification catalyst for exhaust gases of internal combustion engines especially of automobiles and waste gases from industrial plants and, for instance, as a catalyst for complete oxidation of carbon monoxide, hydrocarbons and other compounds if supporting a certain noble metal as represented by platinum and palladium and as a catalyst for reducing nitrogen oxides $NO_x$ if supporting a noble metal as represented by ruthenium, platinum and rhodium.

The industrial plant waste gas to which the purification system in accordance with the present invention will be applied includes: e.g., waste gases exhausted from an enameled wire baking furnace, waste gas from a resinified steel sheet baking furnace, waste gas from an offset printing machine or like waste gas consisting mainly of organic solvents; waste gases exhausted from a manufacturing process of synthetic fibres, such as "Vinylon", containing harmful and irritative compounds, such as formaldehyde; waste gases from organic catalytic reaction processes for the production of, e.g., phthalic anhydride, maleic anhydride, acrylic acid or ethylene oxide; and waste gases from a manufacturing process of tobacco. Since such organic solvents are extremely harmful to human body and accompanied by the danger of explosion according to their concentration, it is necessary to eliminate them from industrial plant waste gases completely. Many organic compounds contained in trace amounts in the industrial plant waste gases have an unbearable offensive odor even in a concentration of few ppm, so that they must be eliminated completely.

The alumina sol used in the method of the present invention may be amorphous fibrous colloidal alumina in a concentration of 5 to 20 % by weight, being prepared by such a method as disclosed in Japanese Patent Publication No. 3658/70, which dissolves when a nitric acid, hydrochloric acid or mixture thereof is added thereto. To the alumina sol there is added a nitric acid, hydrochloric acid, mixture thereof or like inorganic acid to form a solution. The inorganic acid is added in an amount sufficient to adjust the pH value of the alumina sol solution to 4.0 or below, preferably 3.5 or below. When the pH of the solution exceeds 4.5, there occurs an abrupt increase in viscosity of an alumina slurry prepared by adding a rho-alumina-containing powdered alumina to the alumina sol solution to make the alumina coating process unsteady and, in case where the viscosity is 250 cp or more, make the immersing therein of a support difficult, leading to a much loss of alumina. Though the temperature of dissolving the alumina sol is not critical, it is preferred to carry out at temperatures above 50°C and below the boiling point. Though the kind of inorganic acid used is not limited, usually are used a concentrated nitric acid (60 – 62 % by weight) and a concentrated hydrochloric acid (35 % by weight). The concentrated acids may be diluted with water. As previously noted, the alumina sol used in the present invention is disclosed in Japanese patent publication 3658/1970 which relates to a method for preparation of amorphous fibrous colloidal alumina which comprises dissolving aluminum in an aqueous organic solution under a reduced pressure at a temperature less than boiling point of said aqueous organic solution.

The most pertinent condition to obtain an amorphous fibrous colloidal alumina free from crystalized alumina comprises dissolving aluminum in an aqueous organic solution while agitating thereof at a temperature more than 70°C but at least 3°C lower than boiling point of said solution maintaining the pressure less than 60 mm Hg. The organic acids usable for this invention are, for example, formic acid, acetic acid, latic acid, butyric acid and propionic acid.

The rho-alumina-containing powdered alumina to be added to an acid solution of alumina sol includes, in addition to powdered rho-alumina itself, other finely divided alumina containing at least 50 % by weight of rho-alumina as to be activated on calcination, such as, e.g., gamma-, pseudo-gamma-, eta-, zeta-, chi-, kappa- and theta-alumina. All the alumina preferably are in a finely powdered form of a weight accumulative average particle size (median diameter) of 25 microns or less. An especially good result is obtained when a powdered alumina used is of a weight accumulative average particle size distribution where particles of sizes not exceeding 50 microns amount to at least 80 % and not exceeding 100 microns amount to substantially 100 %.

To the aforesaid acid solution of alumina sol there is added a rho-alumina-containing powdered alumina to prepare an alumina slurry. The preparation is carried out at a temperature of 0° to 30°C. The rate of increase of viscosity of an alumina slurry is greatly affected by the temperature and at a temperature above 30°C the viscosity increases abruptly, and at a viscosity above 250 cp it is very difficult to coat a support therewith immersing the support therein. This leads to a a substantial loss of alumina slurry to make it impossible to carry out the method in a commercial scale. Thus, it is necessary to keep the temperature of an alumina slurry throughout the steps of preparation, storage and immersing at 0° to 30°C.

The alumina solid content of the alumina slurry preferably is of 20 to 70 % by weight, and the viscosity is adjusted to 10 to 250 cp upon immersing therein of a support. A support is immersed in the alumina slurry for about 30 to 180 seconds, then taken out thereof and blown off of excess alumina slurry by means of an air jet to obtain a thin uniform coating on the support surface. After aging at a temperature not exceeding 50°C for at least 30 minutes, the support is dried at a temperature of 80° to 150°C and, if necessary, calcined at a temperature of 300° to 600°C to obtain a support having a firmly bonded thin film of an activated alumina.

The activated alumina film supported on the support surface preferably is of a thickness within the range of 30 to 300 microns and the thickness may be adjusted to a desired value by appropriate adjustments of the concentration of the alumina slurry, the viscosity upon immersing of the slurry and the degree of the blowing-off of excess slurry. An amount of the supported alumina is 30 to 300g per litre of the support. The alumina film thus formed in accordance with the present invention is firmly bonded to the surface of a support, so that it is little rubbed off by fingers and, even if scratched by a knife edge, it remains stable leaving a scratch only.

In accordance with our view, the powdered rho-alumina added to the acidic alumina sol solution is hydrated and, through an interaction with the alumina sol, forms a highly adherent and strong film on the surface of the support. It also has been found out that a mixed alumina containing at least 50 % by weight of rho-alumina also gives a firmly bonded alumina film from a slurry in an acidic alumina sol solution. On the other hand, an alumina film prepared by using an alumina slurry consisting only of water and either rho-alumina or an activatable mixed alumina containing at least 50 % by weight of rho-alumina is easily rubbed off by finger since the film consists of finely powdered alumina particles deposited on the surface of a support. Although there occurs hydration of rho-alumina when rho-alumina is dispersed in water, as in the case of the alumina slurry of the present invention, to cause increase in viscosity, the strength of the film itself and the adhesion of the film to the support are unsatisfactory as indicated by the Control 1 set forth hereinafter. Thus, it is necessary for forming a firm adherent alumina film on a support to use an alumina slurry containing at least both dissolved alumina sol and hydrated alumina originated from rho-alumina, though the proportions of the two components are not critical.

It is, however, preferred that the alumina content originated from the alumina sol amounts to at least 5 % by weight of the total weight of alumina contained in the alumina slurry of the present invention and, on the other hand, from the economical point of view, it is preferred to be used in an amount not exceeding 50 % by weight.

The refractory support of the present invention on to which the activated alumina and noble metal are supported is a solid monolithic skeletal body having a plurality of unobstructed openings or channels extending therethrough in a direction of desired fluid flow and is preferably sized and shaped to cover at least a major portion of the cross-sectional area of the refraction zone in which it is to be used.

The support is constructed of a substantially chemically inert, substantially catalytically inactive rigid solid material capable of maintaining its shape and strength at high temperatures, for example up to 1,100°C or more, and has a low coefficient of thermal expansion resisting expansion and shrinkage accompanying rapid change of temperature. The material has an apparent bulk density of 0.2 to 1.0 g/cc, preferably 0.3 to 0.7 g/cc and a number of gas channels per square inch (cell density) of 25 to 500, preferably 50 to 250. Channels in the support may be in the shape of, e.g., triangles, rectangles, sinusoids, circles, honeycombs, corrugates, criss-cross splits, etc. Therefore, "honeycomb structure" in the present invention means these structures. Further, this support has considerable accessible porosity as distinguished from the substantially non-porous porcelain utilized for electrical appliances. The accessible pore volume not including the volume of the fluid flow channels is at least 0.15 cc/g determined by means of water absorption.

Typical material of the refractory are cordierite, alumino-silicates containing lithium, petalite, spondumene, mullite, silimanite, magnesium silicate, zirconia, silicon carbide, alpha-alumina and the like. Among these, a cordierite support is put in market under trade name of AlSiMag 795 and alpha-alumina supports are under trade names of AlSiMag 614 and AlSiMag 776 by American Lava Corporation.

The honeycomb-structured support having an alumina film thus formed is impregnated in a solution containing a noble metal, such as of chloroplatinic acid or palladium chloride. The impregnating time varies depending on the concentration of a catalytic matter and a desired deposition of a noble metal usually within the range of from 30 seconds to 120 minutes. The support is then taken out of the solution and usually, but not necessarily, blown off by, e.g., air stream to eliminate excess solution.

The noble metal used in the present invention includes platinum group metals in the periodic table, i.e. ruthenium, rhodium, palladium, osmium, iridium and platinum, and is used in the form of simple substance or compound and either alone or in mixtures. Though the noble metals usually are used in the form of water soluble salts, such as, palladium nitrate, ruthenium nitrate, rhodium nitrate and like nitrates; palladium chloride, hexachloroiridic (IV) acid, rhodium chloride and like chlorides; chloroplatinic acid and like metallic acids; and palladium acetate, they may be used in the form of metallic colloids. The noble metal is supported as metal in an amount of 0.1 to 5, preferably 0.2 to 3 g/litre of support.

The support thus treated is then dried at 30° to 150°C, preferably at 50° to 130°C and thereafter subjected to activation. The activation is attained either by calcining it at a temperature of 300° to 600°C, preferably of 350° to 550°C for 1 to 10 hours, preferably 2 to 3 hours in an oxidative atmosphere such as in air or by reducing at a temperature of 150° to 600°C, preferably of 200° to 500°C in a reductive atmosphere containing, e.g., hydrogen, formaldehyde or like reducing agent to obtain a finished catalyst.

The following Example 1 to 6 and Control (Comparative Example) 1 to 4 concerned the preparation of specimens for evaluation test of alumina films.

EXAMPLE 1

To 100 g of an alumina sol of an alumina content of 15 % by weight there was added 15 cc of a 62 % nitric acid and, after heating to effect solution of alumina sol, added thereto nitric acid little by little to adjust the pH of the solution to 2.9. The solution was cooled to room temperature, then added thereto 65 g of a finely powdered rho-alumina having a weight accumulative average particle size (median diameter) of 11 microns and containing particles of sizes of 50 microns or more in the amount of 5 % by weight to prepare an alumina slurry of an alumina content of 43 % by weight. The slurry was stirred at 15°C, and when its viscosity reached 100 cp, a cordierite plate of 30 mm × 50 mm × 1.5 mm and of a porosity of 31 % was immersed therein for 60 seconds. The plate taken out of the slurry was eliminated of excess slurry, allowed to stand still at 30°C for 3 hours, then dried at 100°C for 3 hours and finally calcined at 500°C for 5 hours to obtain a support supporting 0.17 g of alumina.

EXAMPLE 2

An alumina sol was prepared in the same way as in Example 1, then added thereto 65 g of a finely powdered rho-alumina of a weight accumulative average particle size (median diameter) of 20 microns and of a content of particles of sizes of 50 microns or more of 20 % by weight to form an alumina slurry. The same supporting procedure as in Example 1 was repeated using the slurry to obtain a support supporting 0.15 g of alumina.

EXAMPLE 3

The same procedure as in Example 1 was repeated except that there were used 45 g of the rho-alumina and 20 g of a finely powdered eta-alumina of a weight accumulative average particle size (median diameter) of 15 microns and of a content of particles of sizes of 50 microns or more of 5 % by weight to obtain a support supporting 0.15 g of alumina.

EXAMPLE 4

The same procedure as in Example 3 was repeated except that there was used 20 g of a finely powdered gamma-alumina of a weight accumulative average particle size (median diameter) of 13 microns and of a content of particles of sized of 50 microns or more of 8 % by weight in place of the eta-alumina to obtain a support supporting 0.15 g of alumina.

EXAMPLE 5

To 50 g of an alumina sol of an alumina content of 15 % by weight there was added 10 cc of a 62 % nitric acid and, after heating to effect solution, added with 50 cc of water and then with a small quantity of nitric acid to adjust its pH to 2.9. Thereafter, in the same manner as in Example 1 to the solution was added 70 g of the same rho-alumina as used in Example 1 to obtain an alumina slurry of an alumina content of 42 % by weight and finally to obtain a support supporting 0.16 g of alumina.

EXAMPLE 6

The same procedure as in Example 1 was repeated except that there was used the rho-alumina in the amount of 55 g and 44 g of the same gamma alumina as used in Example 4 to obtain a support supporting 0.19 g of alumina.

CONTROL 1

To 110 cc of water there was added 90 g of the same rho-alumina as used in Example 1 to form an alumina slurry and the slurry was processed in the same manner as in Example 1 to obtain a support supporting 0.15 g of alumina. The viscosity of the slurry on immersing was 100 cp.

CONTROL 2

To 110 cc of water there was added 90 g of the same finely powdered gamma-alumina as used in Example 4 to form an alumina slurry and the slurry was processed in the same manner as in Example 1 to obtain a support supporting 0.09 g of alumina. The viscosity of the slurry on immersing was 20 cp.

CONTROL 3

To 110 cc of water there was added 90 g of a finely powdered gamma-alumina of a weight accumulative average particle size (median diameter) of 0.8 micron and a content of particles of sizes of 3 microns or more of 2 % by weight to form a slurry and the slurry was processed in the same manner as in Example 1 to obtain a support supporting 0.10 g of alumina. The viscosity of the slurry on immersing was about 30 cp.

CONTROL 4

The same procedure as in Example 1 was repeated except that a support immersed in an alumina slurry was immediately dried. The amount of alumina supported on the support was 0.17 g.

EXAMPLE 7

Adhesive strength test:

The alumina-coated cordierite plates prepared in Examples 1 to 6 and Controls 1 to 4 were subjected to adhesive strength tests by three testers X, Y and Z as follows:

Test A: Pressing a finger of a rubber-gloved hand against the alumina film.

Test B: Rubbing the alumina film by a finger of a rubber-gloved hand.

Test C: Scratching the alumina film by a smoothly rounded end of a glass rod of a diameter of about 5 mm.

The test results were evaluated as follows:
in Test A and B,

I - 1: Alumina dust was not adhered to the rubber-gloved hand at all.

I - 2: Alumina dust adhered a little to the rubber-gloved hand.

I - 3: An appreciable amount of alumina dust adhered to the rubber-gloved hand to form a white spot.

and in Test C,

II - 1: The alumina film was not injured at all.

II - 2: The alumina film was scratched slightly along the scratch line.

II - 3: The alumina film was scratched along the scratch line and cracked or abraded along the scratch line.

The results were as summerized in the following Table 1.

Table 1

| Example Nos. | Test A | | | Test B | | | Test C | | |
|---|---|---|---|---|---|---|---|---|---|
| | X | Y | Z | X | Y | Z | X | Y | Z |
| 1 | I-1 | I-1 | I-1 | I-1 | I-1 | I-1 | II-1 | II-1 | II-1 |
| 2 | I-1 | I-1 | I-1 | I-1 | I-1 | I-1 | II-1 | II-1 | II-1 |
| 3 | I-1 | I-1 | I-1 | I-1 | I-2 | I-1 | II-1 | II-1 | II-1 |
| 4 | I-1 | I-1 | I-1 | I-1 | I-1 | I-1 | II-1 | II-1 | II-1 |
| 5 | I-1 | I-1 | I-1 | I-1 | I-1 | I-1 | II-1 | II-1 | II-1 |
| 6 | I-1 | I-1 | I-1 | I-1 | I-1 | I-2 | II-1 | II-1 | II-1 |
| Control 1 | I-3 | I-3 | I-3 | I-3 | I-3 | I-3 | II-2 | II-2 | II-2 |
| Control 2 | I-3 | I-3 | I-3 | I-3 | I-3 | I-3 | II-2 | II-2 | II-2 |
| Control 3 | I-3 | I-3 | I-3 | I-3 | I-3 | I-3 | II-2 | II-2 | II-2 |
| Control 4 | I-3 | I-2 | I-2 | I-3 | I-3 | I-2 | II-2 | II-2 | II-2 |

CONTROL 5

To 100 g of the same alumina sol as used in Example 1 there was added 15 cc of a 62 % nitric acid to form an alumina sol solution. In the solution there was immersed the same cordierite plate as used in Example 1 for 1 minute. The plate was then eliminated of excess solution, allowed to stand still at 30°C for 1 hour and dried at 100°C for 3 hours. The dried plate was immersed in the aforesaid solution again and, after drying, calcined at 500°C for 5 hours. In the alumina film thus formed there were many cracks and result of the Test C on the plate was II-3.

EXAMPLE 8

Abrasion test by air shock:

a honeycomb-structured cordierite support having about 225 square-sectioned gas passageways per 25 mm square (25 mm × 25 mm) and a wall thickness of about 0.23 mm was cut into an about 25 mm cube and the cube was subjected to alumina supporting treatment.

The honeycomb support was immersed for 1 minute in an alumina slurry, as listed in the following Table 1, blown off by air to remove excess slurry in the passageways, allowed to stand still at 35°C for 2 hours, dried at 100°C over 2 hours and calcined at 550°C for 3 hours. The alumina film-deposited honeycomb support was mounted in a 28 mm square stainless steel pipe, the gaps between the inner wall of the pipe and the outer surface of the honeycomb support being packed with a ceramic wool as to allow air pass through the passageways or cells in the honeycomb support only. The pipe thus fitted with the honeycomb support was fixed to a nozzle equipped with an electromagnetic valve and connected to an iron vessel of a capacity of about 40 litres. The iron vessel was so equipped with a compressor as to be constantly pressurized and, when its inner pressure reached 1.5 Kg/cm$^2$ G, open the electromagnetic valve for 1 second thereby to impose an air shock to the honeycomb support. Each sample was subjected to 40 air shocks to determine the abrasion of the alumina film by air shocks. The alumina slurries used in this Example were those prepared in accordance with Examples 1, 3 and 5 and Control 3, respectively.

The results were as summarized in the following Table 2.

Table 2

| Alumina slurry | Supported alumina (g) | Abrasion loss (g) | (%) Abrasion ratio |
|---|---|---|---|
| Example 1 | 3.11 | 0.05 | 1.6 |
| Example 3 | 3.27 | 0.05 | 1.5 |
| Example 5 | 3.20 | 0.06 | 1.9 |
| Control 3 | 2.40 | 1.32 | 55.0 |

EXAMPLE 9

The same test procedure as in Example 8 was repeated except that a nichrome wire was wound around a section of the stainless steel pipe where the alumina film deposited honeycomb support was fitted and five air shocks were imposed when the section reached 600°C. The alumina film-deposited honeycomb supports were prepared using the alumina slurry as prepared in Examples 1, 3 and 5. The abrasion test results were as summarized in the following Table 3.

Table 3

| Alumina slurry | Supported alumina (g) | Abrasion loss (g) | Abrasion ratio(%) |
|---|---|---|---|
| Example 1 | 3.30 | 0.05 | 1.5 |
| Example 3 | 3.18 | 0.05 | 1.6 |
| Example 5 | 3.32 | 0.06 | 1.8 |

EXAMPLE 10

In this example, there was used a sintered silicon carbide plate of 30 mm × 50 mm × 1.0 mm in place of a cordierite plate as used in Example 1, and there was used an alumina slurry as prepared in Examples 1, 3 and 5. The adhesive strength test was carried out in accordance with Example 7. On the tests, no alumina dust adhered to the rubber-gloved hand in all cases and none of the alumina films was scratched off when rubbed by a glass rod.

EXAMPLE 11

To 100 g of an alumina sol of an alumina content of 15 % by weight there was added 20 cc of a 35 % hydrochloric acid and, after heating to effect solution, added thereto a hydrochloric acid to adjust its pH to 2.5. The solution was cooled to room temperature and added with 50 g of a rho-alumina as used in Example 1 to form an alumina slurry of an alumina content of 37 % by weight.

When the viscosity of the alumina slurry reached 30 cp, the same plate support as used in Example 1 was immersed therein and processed in the same manner as in Example 1 to obtain a support supporting 0.11 g of alumina. The alumina film thus formed was very tough and, in the adhesive strength test, was not adhered to a rubber-gloved hand and was not scratched by a glass rod.

EXAMPLES 12 TO 13

Two alumina sol hydrochloric acid solutions were prepared in the same way as in Example 11 and to one of the solutions there were added 35 g of a rho-alumina and 15 g of a eta-alumina as used in Example 3 and to the other of the solutions were added 35 g of a rho-alumina and 15g of a gamma-alumina as used in Example 4 to prepare alumina slurries. Each specimen of the same support as used in Example 1 was immersed separately in the slurries and processed in the same manner as in Example 1 to obtain supports supporting 0.11 g and 0.10 g of alumina, respectively. The viscosities of the slurries on immersing were both 30 cp. The alumina films thus obtained were very tough and their strengths were the same with that of the alumina film prepared in Example 11.

EXAMPLE 14 TO 15

Each 100 g of alumina sol of an alumina content of 10 % by weight were added with 9 cc of 62 % by weight nitric acid and, after heating to effect solution, further added with a nitric acid to adjust therein pH to 3.1. To one of the solutions there was a added 50 g of the same rho-alumina as used in Example 1 and to the other were added 35 g of the same rho-alumina as used in Example 3 and 15 g of eta-alumina to form two alumina slurries. Each of the slurries was used for preparation of an alumina supporting support in the same manner as in Example 1. The viscosity of the former slurry on immersed therein of a support was 30 cp and that of the latter slurry was also 30 cp. The alumina contents of the alumina supporting supports were 0.10 g and 0.11 g, respectively. The alumina films thus obtained were very tough and their strengths were the same with that of the alumina film prepared in Example 1.

EXAMPLE 16

The same alumina film-supporting support as prepared in Example 1 was heated to 600°C and immediately thereafter put in a 2-litres beaker filled with water. No crack was formed in the alumina film and there was observed no change in appearance.

CONTROL 6

To 100 g of an alumina sol of an alumina content of 15 % by weight there was added 15 cc of a 62 % nitric acid and, after heating to effect solution, the pH of the solution was adjusted to 2.9 by addition of a nitric acid. The solution was cooled to room temperature, then added thereto 65 g of the same gamma-alumina as used in Example 3 to form an alumina slurry of an alumina content of 43 % by weight. When the viscosity of the alumina slurry reached 30 cp at 25°C, a specimen of the same support as used in Example 1 was immersed therein for 60 seconds and thereafter processed in the same manner as in Example 1 to obtain a support supporting 0.09 g of alumina. When subjected to the same test as in Example 16, the alumina film was cracked.

EXAMPLE 17

To 500 g of an alumina sol of an alumina content of 17 % by weight there was added 95 cc of a 62 % nitric acid and the alumina sol was heated to effect solution. The solution was of a pH of 2.7. The solution was cooled to room temperature and added with 325 g of a finely powdered rho-alumina of a weight accumulative average particle size of 11 microns and of a content of particles of sizes of 50 microns or more of 5 % by weight to form an alumina slurry of an alumina content of 43 % by weight. The alumina slurry was stirred at 15°C and, when its viscosity reached 100 cp, a honeycomb-structured cylindrical cordierite support of a diameter of 3.66 inches and a length of 3 inches, a weight of 260 g, a porosity of 31 %, having 225 square-sectioned gas passageways per 25 mm square (25 mm × 25 mm), and of a thickness of the wall of the passageway of about 0.23 mm was immersed therein for 60 seconds and blown off by air to remove excess alumina slurry retained in the passageways. The support was then allowed to stand still at 25°C for 30 minutes and then at 40°C for 2 hours, dried at 100°C for 3 hours and calcined at 500°C for 5 hours. The amount of alumina supported on the support was 72 g.

The support was put in a glass vessel of an inner diameter of 95 mm and a height of 100 mm, then poured therein 500 cc of an aqueous chloroplatinic acid solution containing as platinum 500 ppm (0.5 g Pt/litre) to impregnate the support for 5 minutes. The solution retained by the support was blown off by air stream and the support was dried in air at 60°C for 3 hours and calcined at 500°C for 3 hours in a reductive atmosphere of a hydrogen-containing gaseous nitrogen stream to obtain 332 g of a finished catalyst supporting 0.137 g of platinum.

The catalyst thus obtained was wound by a ceramic wool and packed in a cylindrical stainless steel muffler to subject to a bench durability test using a commercially available 4-cylindered engine of a displacement of 1,600 cc. The testing apparatus was equipped with, other than the aforesaid engine, a secondary air feeding pump, a 3-position automatic transmission, an eddy type dynamometer, a flywheel corresponding to the weight of an automobile body and a disk brake. The conversion efficiency of the catalyst was evaluated by means of testing procedure of California 7-modes hot cycle, using a programmer previously memorized a road load corresponding to an actual run, and, as the mileage accumulation mode between the evaluation points, the engine was operated alternately at a speed corresponding to 40 miles/hr and at a speed corresponding to 50 miles/hr at periods of 90 seconds, on each change of speed the engine being always decelerated to 20 miles/hr. in 15 seconds and accelerated to the next prescribed speed in 15 seconds at full throttle. The fuel used was a non-leaded gasolin of HEW class in U.S.A. standard, and the evaluation of activity was made on a fresh catalyst and after 5,000 Km run and 10,000 Km run. The results were as summarized in the following Table 4.

Table 4

| Catalyst | CO conc. (%) Inlet | CO conc. (%) Outlet | CO conversion (%) | HC conc. (ppm) Inlet | HC conc. (ppm) Outlet | HC conversion (%) |
|---|---|---|---|---|---|---|
| Fresh Cat. | 0.675 | 0.035 | 94.7 | 2527 | 286 | 88.6 |
| After 5,000 Km run | 0.822 | 0.037 | 95.5 | 2405 | 280 | 88.3 |
| After 10,000 Km run | 0.805 | 0.048 | 95.2 | 2443 | 298 | 87.9 |

The analysis was carried out by means of a MEXA-18-S analyser manufactured by Kabushiki Kaisha Horiba Seisakusho, by means of a non-dispersive infrared gas analyser (NDIR) with respect to CO, by means of a flame ionization gas analyser with respect to H.C. and by means of an electromagnetic analyser with respect to $O_2$.

The surface of the fresh catalyst was smooth and could be rubbed by finger without any abrasion loss of the surface. After 10,000 Km running test, the weight of the catalyst was 332 g indicating loss of catalyst of substantially zero. When the catalyst was broken, there was observed no crack or abrasion loss in the alumina film supported on the honeycomb support.

CONTROL 7

To 550 cc of water there was added 450 g of the same finely powdered rho-alumina as used in Example 17 to form an alumina slurry and the slurry was processed in the same way as in Example 17 to obtain a support supporting 69 g of alumina. The viscosity of the slurry on immersing was 100 cp. The alumina film-supporting support was processed in the same manner as in Example 17 to support thereon platinum and calcined in a hydrogen-containing gaseous nitrogen stream to obtain 329 g of a finished catalyst supporting 0.145 g of platinum. When the catalyst was subjected to the same durability test of activity as in Example 17, there was observed a significant deterioration in activity. The test results were as summarized in the Table 5.

Table 5

| Catalyst | CO conc. (%) Inlet | CO conc. (%) Outlet | CO conversion (%) | HC conc.(ppm) Inlet | HC conc.(ppm) Outlet | HC conversion (%) |
|---|---|---|---|---|---|---|
| Fresh cat. | 0.712 | 0.028 | 96.1 | 2610 | 310 | 88.1 |
| After 5,000 Km run | 0.853 | 0.072 | 91.5 | 2570 | 884 | 65.7 |

The surface of the fresh catalyst was dusty and, when touched by finger, a powder adhered the finger. The weight of the catalyst after 5,000 Km running was 311 g, indicataing 26% by weight of the supported alumina being blown off. When the catalyst was broken, there was observed no crack but significant degree of abrasion in the alumina film.

CONTROL 8

An alumina sol solution was prepared in the same way as in Example 17, then added thereto 325 g of a gamma-alumina of a weight accumulative average particle size (median diameter) of 13 microns and of a content of particles of sizes of 50 microns or more of 8% by weight to form an alumina slurry. When the viscosity of the alumina slurry reached 30 cp, the same support as used in Example 17 was immersed therein to support alumina thereon. The immersing procedure was repeated once more to support alumina in the total amount of 73 g. The support was processed in the same manner as in Example 17 to support thereon platinum and calcined in the same manner in a hydrogen-containing gaseous nitrogen stream to obtain a finished catalyst of a platinum content of 0.205 g. The weight of the finished catalyst was 333 g. The catalyst was subjected to a durability test of activity using a bench test apparatus as used in Example 17 to obtain the results as summarized in the following Table 6.

Table 6

| Catalyst | CO conc. (%) Inlet | CO conc. (%) Outlet | CO conversion (%) | HC conc.(ppm) Inlet | HC conc.(ppm) Outlet | HC conversion (%) |
|---|---|---|---|---|---|---|
| Fresh cat. | 0.805 | 0.035 | 95.7 | 2472 | 306 | 87.6 |
| After 5,000 Km run | 0.730 | 0.049 | 93.3 | 2630 | 545 | 79.3 |
| After 10,000 Km run | 0.842 | 0.107 | 87.3 | 2687 | 1190 | 55.8 |

The surface of the fresh catalyst was smooth and rubbed off little when rubbed by fingers, like as the catalyst used in Example 17. The weight of the catalyst after 10,000 Km running was 328 g, indicating 7.0% of the supported alumina being blown away during the running. When the catalyst was broken for visual observation, there were observed fine cracks in the alumina film inside the catalyst, and the cracking was intensive on the gas inlet side, considerable portions of the alumina film being abraded.

EXAMPLE 18

To 100 g of an alumina sol of an alumina content of 17% by weight there was added 17 cc of a 62% nitric acid and the mixture was heated to effect solution of the alumina sol. The pH of the solution was 2.9. The solution was cooled to room temperature, then added thereto 55 g of the same rho-alumina as used in Example 17 and 20 g of the same gamma-alumina as used in Control 8 to form an alumina slurry of an alumina content of about 46% by weight. The alumina slurry was stirred at 25°C and, when its viscosity reached 100 cp, a cylindrical support of a diameter of about 25 mm and a length of 31 mm having in its crosssection 135 gas passageways (its volume being approximately 15 cc), cut from the same honeycomb support as used in Example 17, was immersed for 60 seconds therein. The support was then processed in the same manner as in Example 17 to obtain a support supporting 2.2 g of alumina.

The support so coated was sufficiently dried and put in a glass beaker of an inner diameter of 26 mm and a height of 50 mm, then added thereto 15 cc of an aqueous chloroplatinic acid solution of 0.5 g Pt/litre (Pt concentration of 500 ppm). After impregnating at room temperature for 5 minutes, the support was gently blown off by air to remove excess solution and then subjected to reduction at 500°C for 3 hours in a stream of a geseous nitrogen containing 5% of hydrogen to obtain a finished catalyst containing 0.0051 g of platinum (corresponding to 0.34 g Pt/litre catalyst).

The catalyst was subjected to an oxidation activity test using exhaust gases of a commercially available engine. In the test, the catalyst was packed in a stainless steel U-shaped pipe immersed in a fused salt bath maintained at 400°C and portion of a waste gas was mixed with secondary air and passed through the pipe at a rate of 15 N litres/min. corresponding to a space velocity of 60,000 $hr^{-1}$.

The gas at inlet contained 0.5 to 1.0% of CO, 1,400 to 1,700 ppm (calculated as methane) of HC, 5% of $O_2$ and water vapor, as determined by means of a MEXA-18-S manufactured by Kabushiki Kaisha Horiba Seisakusho (CO: NDIR, HC: FID, $O_2$: electromagnetic analyser). The engine was operated on a non-leaded gasolin of HEW grade in U.S.A. standard. Under the aforesaid conditions, the initial activity, the activity after a continuous run for 50 hours and after a thermal treatment at 980°C for 24 hours in an oxidative atmosphere were determined. The results of oxidation activity test were as summarized in the following Table 7.

Table 7

|  | Fresh cat. | After 50 hrs running | After heat treatment at 980°C for 24 hrs |
|---|---|---|---|
| CO conversion(%) | 98.6 | 98.2 | 95.0 |
| HC conversion(%) | 93.0 | 92.5 | 89.6 |

EXAMPLE 19

To 100 g of an alumina sol of an alumina content of 10% by weight there was added 10 cc of a 62 wt.% nitric acid and the mixture was heated to effect solution of alumina sol. The pH of the solution was 3.1. The solution was cooled to room temperature, then added thereto 70 g of the same rho-alumina was used in Example 17 to form an alumina slurry. The alumina slurry was then processed in the same manner as in Example 18 to obtain an alumina-coated support supporting 1.9 g of alumina. The alumina-supporting support was put in a glass vessel of the same dimensions as that used in Example 18 and impregnated at room temperature for 15 minutes in 15 cc of a mixed aqueous solution of chloroplatinic acid and palladium chloride containing as platinum 400 ppm and as palladium 200 ppm. Thereafter, the support was blown off to remove excess solution and directly calcined at 500°C for 3 hours in a stream of a gaseous nitrogen containing 5% of $H_2$ as reducing agent to obtain a finished catalyst containing palladium in an amount as metal of 0.0018 g (0.12 g/litre cat.) and platinum in an amount as metal of 0.0035 g (0.25 g/litre cat.).

The catalyst was subjected to the same oxidation activity test as in example 18 to obtain the results as shown in the Table 8.

Table 8

|  | Fresh cat. | After 50 hrs. | After heat treatment at 980°C for 24 hours |
|---|---|---|---|
| CO conversion(%) | 98.3 | 97.5 | 95.2 |
| HC conversion(%) | 91.6 | 90.3 | 85.7 |

EXAMPLE 20

To 100 g of an alumina sol of an alumina content of 17% by weight there was added 19 cc of a 62 wt.% nitric acid and the mixture was heated to effect solution and the solution of a pH of 2.7 was cooled to 25°C, then added thereto 65 g of the same rho-alumina as used in example 17 to form an alumina slurry of an alumina content of 43% by weight. The slurry was stirred at 25°C and, when its viscosity reached 100 cp, a honeycomb support of the same shape as used in example 18 was immersed therein for 60 seconds and then processed in the same manner as in Example 17 to obtain an alumina-coated support. The coated support was put in a glass beaker of an inner diameter 26 mm and a height 50 mm and impregnated in 15 cc of an aqueous chloroplatinic acid solution containing 2 g Pt/litre (as Pt concentration of 2,000 ppm). After 5 minutes impregnation, the support was gently blown off by air to remove excess solution and then calcined at 500°C for 3 hours in a stream of a gaseous nitrogen containing 5% of hydrogen to obtain a finished catalyst containing 0.0145 g of platinum (0.97 g Pt/liter cat.).

The catalyst was subjected to a performance test in a waste gas purifying apparatus installed in a phthalic anhydride manufacturing plant. In the test, the catalyst was packed in a stainless steel reaction tube of an inner diameter of 28 mm, heated to a prescribed temperature by means of an electric heating and passed therethrough a waste gas while evaluating the activity by sniffing at the effluent from the reaction tube. The catalyst exhibited an activity of such a degree as that at a gas temperature at inlet of 220°C the effluent gas from the reaction tube became odorless.

EXAMPLE 21

The catalyst as prepared in Example 20 was packed in a reactor connected to an exhaust blower installed on the outlet of a draught of an enameled wire baking furnace to carry out a combustion test of a waste gas exhausted from the furnace. The average concentrations of combustible matters in the waste gas were: naptha 865 ppm, cresol 1236 ppm and phenol 102 ppm. The waste gas of an enameled wire baking furnace was passed through the catalyst bed at a space velocity of 20,000 $hr^{-1}$ at 300°C. The concentrations of the combustible matters in the effluent gas were trace amount. The analysis of the harmful components mentioned above was made by a gas chromatography.

EXAMPLE 22

A cylinder of a diameter of 30 mm and a length of 42.5 mm was cut from the same cordierite support as used in Example 17. The support was of a weight of 15.6 g and a volume of 30 cc. An alumina slurry was supported on the support and dried and calcined in the same manner as in Example 1 to obtain an alumina-coated support containing 4.3 g of alumina. The coated support was put in a glass vessel of an inner diameter of 32 mm and a height of 70 mm, then added thereto a solution of 0.00635 g of hexachloroiridic (IV) acid and 0.00767 g of rhodium trichloride in 35 cc of water. The support was dipped in the solution at 25°C for 2 hours. After blown off of excess solution by air, the support was dried at 90°C for 3 hours and calcined at 550°C for 3 hours in a stream of gaseous nitrogen containing 5% of hydrogen to obtain a finished catalyst containing iridium and rhodium each in a concentration of 0.1 g/litre support.

The catalyst thus obtained was packed in a stainless steel reaction tube of an inner diameter of 30 mm. Portion of an exhaust gas of a commercially available 6-cylindered, 2,000 cc displacement engine was heated to a temperature at the inlet of the reaction tube of 400° to 750°C by means of an electric furnace and introduced into the catalyst bed at a rate of 15 N litre/min. (space velocity of 30,000 $hr^{-1}$) for determination of initial activities with respect to purification of nitrogen oxides at temperatures as indicated in the following Table 9 and then of a 5,000 Km durability maintaining an inlet gas temperature at 700°C. The engine was operated on a non-leaded gasolin at a speed of 1,500 rpm, under a boost pressure of 380 mm Hg, at a vehicle speed of 50 Km/hr, and at an air/fuel ratio of 14. The average composition of the exhaust gas was: CO 0.75%, HC 1,800 ppm, oxygen 0.5%, and NO 1,600 ppm. The amount of ammonia formed in the catalyst bed was determined by collecting a portion of the effluent gas from the reaction tube in a 0.5% aqueous boric acid and titrating by means of a standard sulfuric acid solution. There was used a MEXA-18-S analyser, manufactured by Kabushiki Kaisha Horiba Seisakusho (CO: NDIR, HC: FID, $O_2$: Magnetic, NO: NDIR and $NO_2$: UV). The results of the initial activity and durability tests were as summarized in the following Table 9.

Table 9

| Temperature (°C) | $NO_x$ conversion %* |
|---|---|
| Initial | |
| 400 | 68.3 |
| 600 | 80.5 |
| 700 | 90.0 |
| 750 | 92.2 |
| After 5,000 Km run at 700°C | |
| 700 | 87.4 |

*$NO_x$ conversion = $\dfrac{\text{inlet } NO_x\text{—outlet } NO_x\text{—formed } NH_3}{\text{inlet } NO_x} \times 100$ (All component is by volume.)

EXAMPLE 21

Method for preparation of amorphous fibrous alumina sol having A:X=1:0.4, wherein X is acetic acid ion.

Into 3 liter of four-necked reaction flask used for reduced pressure, 2 liter of water and 30 g of 95% acetic acid were charged and the mixture was heated under agitating. When the mixture reached at a temperature of 80°C, 32 g of finely divided aluminum was added into it, a cooling condenser was connected with water stream type aspirator and the reaction was carried out at a temperature of 80°C for about 30 hours maintaining the pressure in the flask at 95 to 100 mm Hg. Then heating and agitation was stopped, the reaction mixture was lasted for about 4 hours. The upper layer (sol) thus obtained was separated by decantation method and undissolved residue in the lower layer was removed. The sol thus obtained was semi-transparent colloidal alumina solution containing 2.7% of $Al_2O_3$. The sol was determined to be amorphous by X-ray diffraction and individual particles were fibrous by electronic microscopic observation.

What is claimed is:

1. A method for the production of a catalyst for purification of exhaust gases of internal combustion engines and waste gases of industrial plants comprising the steps of: dissolving an alumina sol with an inorganic aicd to form an alumina sol solution, adding to the solution a finely powdered alumina containing at least 50% by weight of rho-alumina and capable of forming activated alumina on calcination to form an alumina slurry, immersing in the alumina slurry a monolithic multicellular chemically inert refractory support, while maintaining said slurry at a temperature of 0° to 30°C, to deposit a coating film of alumina on to the surface of said support, aging the immersed support at a temperature not exceeding 50°C for at least 30 minutes, drying said coating film of alumina to form a thin uniform film of alumina on the surface of said support, impregnating the so treated support in a solution or suspension containing a member selected from the group consisting of water soluble salts, metallic acids and metallic colloids of a noble metal to deposit a noble metal thereon and subjecting the noble metal-supporting support to activation at a temperature of 150° to 600°C.

2. A method according to claim 1 in which the alumina sol solution is of a pH of 4.0 or below.

3. A method according to claim 1 in which the inorganic acid is at least one member selected from the group consisting of nitric acid and hydrochloric acid.

4. A method according to claim 1 in which the finely powdered alumina is of a weight accumulative average particle size of 25 microns or less and of a content of particles of sizes of 50 microns or less of at least 80% in the weight accumulative particle size distribution.

5. A method accordiong to claim 1 in which the alumina sol is amorphous fibrous colloidal alumina in a concentration of 5 to 20% by weight, which dissolves when one acid selected from the group consisting of nitric acid and hydrochloric acid is added thereto.

6. A method according to claim 1 in which the alumina content which is originated from the alumina sol in the whole alumina which is contained in the alumina slurry is 5 to 50% by weight.

7. A method according to claim 1 in which an amount of the supported alumina is 30 to 300 g per litre of the support.

8. A method according to claim 1 in which an amount of the supported noble metal is 0.1 to 5 g as metal per litre of the support.

9. A method according to claim 8 in which the noble metal is at least one member selected from the group consisting of platinum, palladium, iridium, rhodium and ruthenium.

10. A method according to claim 8 in which the noble metal is at least one member selected from the group consisting of platinum and palladium.

11. A method according to claim 1 in which the activation is carried out by calcining the supported catalyst at a temperature of 300° to 600°C in an oxidative atmosphere.

12. A method according to claim 1 in which the activation is carried out by reducing at a temperature of 150° to 600°C in a reductive atmosphere.

13. A method according to claim 1 in which the noble metal containing solution is an aqueous solution of a noble metal compound.

14. A method for the production of a catalyst for purification of exhaust gases of internal combustion engines and waste gases of industrial plants comprising the steps of: dissolving an alumina sol with an inorganic acid to form an alumina sol solution, adding to the solution a finely powdered alumina containing at least 50% by weight of rho-alumina and capable of forming activated alumina on calcination to form an alumina slurry, immersing in the alumina slurry a monolithic multicellular chemically inert refractory support, while maintaining said slurry at a temperature of 0° to 30°C, to deposit a coating film of alumina on to the surface of said support, aging the immersed support at a temperature not exceeding 50°C for at least 30 minutes, drying said coating film of alumina to form a thin uniform film of alumina on the surface of said support, calcining said treated support at a temperature of 300° to 600°C, impregnating the so treated support in a noble metal containing solution or suspension to deposit a noble metal thereon and subjecting the noble metal-supporting support to activation.

* * * * *